United States Patent [19]
Morgan

[11] Patent Number: 5,873,486
[45] Date of Patent: Feb. 23, 1999

[54] SELECTIVELY MOUNTABLE CUP HOLDER

[76] Inventor: Charles Morgan, Rte. 1, Box 273, Pelham, Ga. 31779-9766

[21] Appl. No.: 895,688

[22] Filed: Jul. 17, 1997

[51] Int. Cl.[6] .................................................. B65D 25/24
[52] U.S. Cl. ........................ 220/739; 220/903; 220/480; 220/483; 248/311.2; 248/205.2; 248/205.3; 248/206.5
[58] Field of Search ............................. 248/311.2, 205.2, 248/205.3, 206.5; 220/903, 737, 739, 476, 480, 483; 224/901, 273, 311

[56] References Cited

U.S. PATENT DOCUMENTS 3,847,324  11/1974  Uchanski et al. ...................... 220/737
4,015,940  4/1977  Conlon .................................. 248/311.2
5,186,350  2/1993  McBride ................................ 220/483
5,325,991  7/1994  Williams ............................... 220/903
5,660,326  8/1997  Varano .................................. 220/739

FOREIGN PATENT DOCUMENTS 9102475  8/1989  WIPO .................................... 220/903

*Primary Examiner*—Stephen J. Castellano
*Attorney, Agent, or Firm*—Sherman and Shalloway

[57] ABSTRACT

The present invention is directed toward cup holders which are selectively mountable to a plurality of surfaces to hold cups and containers of beverages particularly in vehicles. The invention provides a holder having a plurality of selectable mounting means whereby the user may select that means most appropriate to the surface on which the holder is to be mounted.

18 Claims, 3 Drawing Sheets

SELECTIVELY MOUNTABLE CUP HOLDER

FIELD OF THE INVENTION

The present invention is directed toward cup holders which are selectively mountable to a plurality of surfaces to hold cups and containers of beverages particularly in vehicles. The invention provides a holder having a plurality of selectable mounting means whereby the user may select that means most appropriate to the surface on which the holder is to be mounted.

BACKGROUND OF THE INVENTION

Previous cup holders have been deficient in providing only one means for mounting. Thus, cup holders for vehicles have included structures such as a hook to fit within the window channel in a door of an automobile, or an adhesive means which permanently secures the holder to a console or dashboard surface, or a removable fastening means which releasably attaches the holder to a surface. However, there are no cup holders which combine a plurality of mounting means in a selectable relationship which permits the holder to be attached to different surfaces merely by selecting the appropriate fastener.

Vehicle designs do not always provide a convenient location for one to place cups and other beverage containers. While some people have adopted the use of weighted mugs with non-slip bottoms, these items are not practical where the design of the vehicle does not provide a sufficiently flat surface for placement of the mug. In addition, such mugs are not practical for use with other containers such as bottles, cans and paper cups.

The common alternative is a plastic cup holder having a hook appendage which fits into the window channel and hangs against the interior of the vehicle door. However, these holders are not sufficiently secure to prevent them from being bumped or jostled by the driver or passenger and they frequently come loose from the window channel, particularly on a rough road surface. These hanging type holders are also not usable at other locations within the vehicle.

It is therefor desirable to provide a cup holder which can be mounted to a variety of surfaces within a vehicle and elsewhere and which can be removed and relocated as desired.

SUMMARY OF THE INVENTION

It is an object of this invention to provide a cup holder which is selectably attachable to a plurality of different surfaces.

It is a further object to provide a cup holder having a plurality of mounting means whereby the holder may be attached to different surfaces by activating one or more of the mounting means.

It is a still further object to provide a cup holder wherein the plurality of mounting means are in a stacked relationship.

And it is an even further object to provide a cup holder wherein the plurality of mounting means are in a side-by-side relationship.

Further objects and advantages will become evident from the following description and drawings.

The present invention provides a holder for a beverage container comprising a cylindrical body having an open end and a closed end forming a receptacle, a resilient insert positionable within the receptacle, a base and a plurality of selectable mounting means on the underside of the base, whereby the insert is adapted to receive and hold a beverage container within the receptacle and whereby the selectable mounting means are capable of removably securing the holder to a plurality of alternative surfaces.

The present invention further provides a beverage container holder comprising a planar bottom surface having a substantially cylindrical upstanding sidewall forming a receptacle capable of receiving a beverage container, a cylindrical resilient member receivable within the receptacle and having an outside diameter substantially equal to the inside diameter of the receptacle and capable of snugly and releasable receiving the beverage container whereby the beverage container is held within the receptacle, and a plurality of selectable mounting means secured to the bottom surface of the receptacle on the side opposite to the sidewall whereby the holder is selectably and removably mountable to a plurality of alternative surfaces.

The present invention still further provides a cup holder having a plurality of selectable mounting means comprising a hook and loop fastener, an adhesive means and a magnetic means positioned on the bottom surface of the receptacle so as to be selectively engagable with a mounting surface and wherein the selective mounting means are positioned on the bottom surface in a stacked relationship in the order of the hook portion of the hook and loop fastener, the loop portion of the hook and loop fastener whereby the hook and loop portions are engaging, the adhesive means and the magnetic means, whereby the magnetic means provides a means for removably mounting the holder on a ferrous metal surface and is removable to expose the adhesive means whereby the holder is adhesively mountable to any surface, and the adhesive means being a part of the loop portion of the hook and loop fastener whereby the loop portion is adhesively fixable to a mounting surface and whereby the adhesive and the loop portion are removable to expose the hook portion of the hook and loop fastener whereby the holder is releasably mountable to a pile covered surface including the adhesively fixed loop portion.

DETAILED DESCRIPTION OF THE INVENTION

Figure 1:
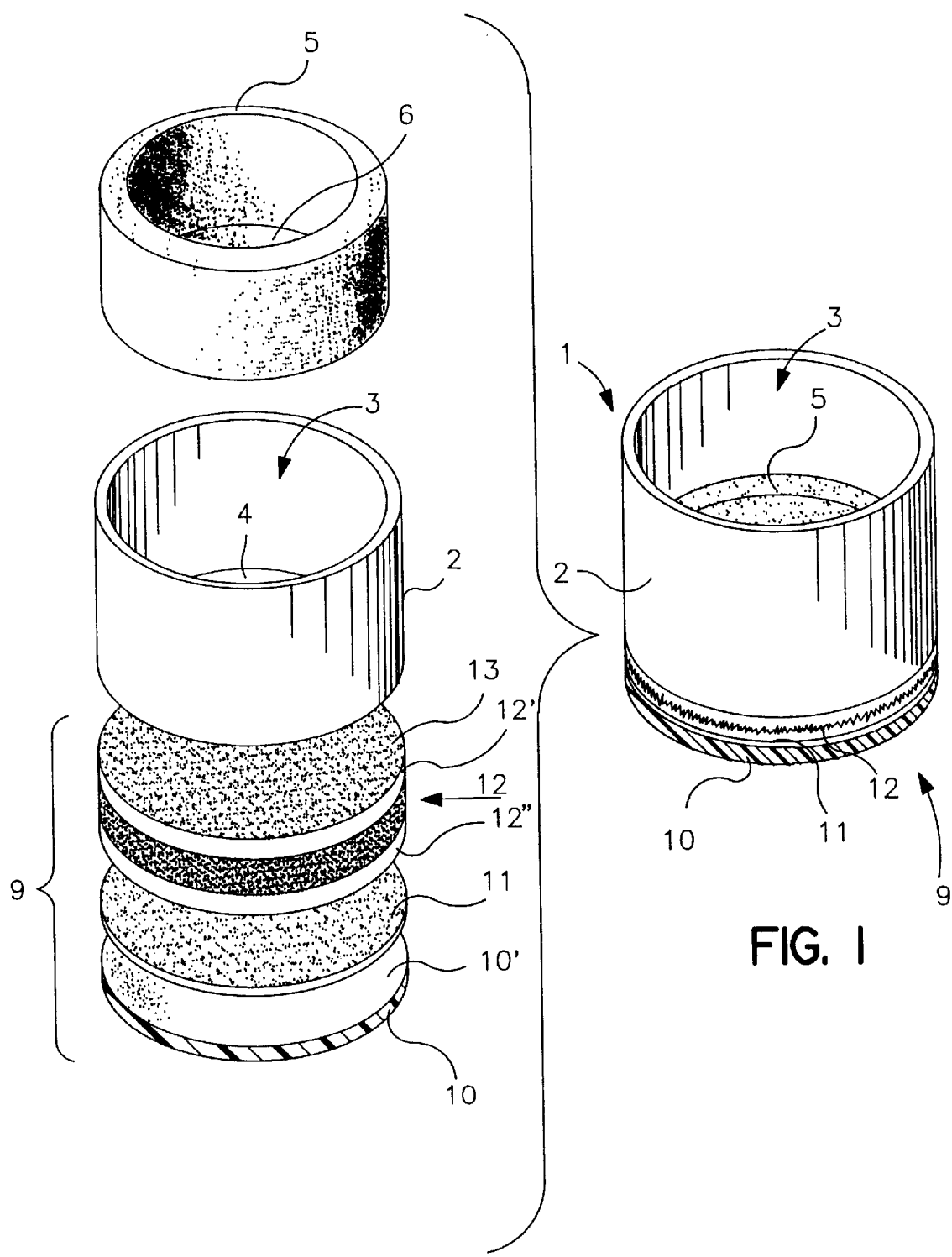
FIG. 1 is an expanded view of the cup holder of the present invention showing the preferred embodiment.

In FIG. 1 there is shown a basic embodiment of the cup holder 1 which comprises a cylindrical body 2 having an open upper end 3 and a closed lower end 4, or base, to form a receptacle. Within the interior of the receptacle a resilient insert 5 is located to provide a snug fit for different sizes of beverage receptacles from bottle, to cans to small, medium and large paper or foam cups.

In one embodiment, the insert 5 is made from a ring of resilient foam material, such as blown urethane and other polymer foams, having an outer diameter which corresponds to the inner diameter of the cylindrical body 2. The insert 5 may be permanently mounted within the body 2 by adhesive or other means, or it may be merely press fit into the body 2 thereby permitting its removal and changing to accommodate different materials and/or sizes. In order to provide additional cushioning for beverage receptacles within the holder 1, the insert 5 may be optionally provided with a bottom layer 6 of resilient material.

Figure 3:
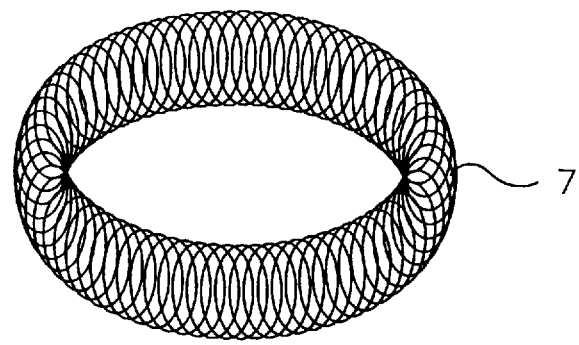
FIG. 3 is a view of the coil spring type resilient insert.
Figure 4:
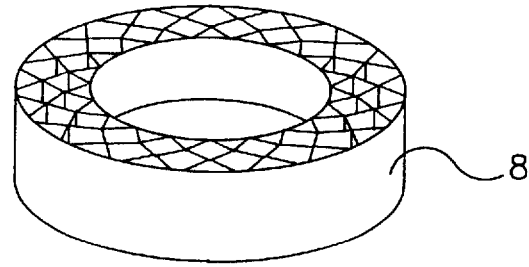
FIG. 4 is a view of the corrugated resilient insert.

Although resilient foam is the preferred material for the insert 5, alternative materials, including somewhat more rigid foams, such as styrofoam, may be used. In addition, structures such as a torus shaped helical spring 7, shown in FIG. 3, or corrugated material formed into a ring 8, as shown in FIG. 4, may be used as inserts 5. In the case of the corrugated material, this may be corrugated paper or card with a water resistant finish so as to guard against moisture from condensation on the beverage container being held, or an extruded plastic material which is cut and then formed into a ring to fit within the cylindrical body 2 of the holder 1.

To provide the desired selectable mounting ability to the holder 1, a plurality of alternative mounting means 9 is secured to the under surface of the lower end 4 of the cylindrical body 2. In the preferred embodiment, the mounting means comprise a magnetic means 10, an adhesive means 11 and a hook and loop fastener 12.

In the embodiment of FIG. 1, the mounting means 9 are arranged in a stacked relationship on the lower end 4 of the body 2. In this relationship, the hook portion 12' of the hook and loop fastener 12 is bonded to the lower end 4 of body 2 by an appropriate adhesive 13 or heat bonding means so as to be reasonably permanently attached with the hook face exposed. Loop portion 12" is affixed to the hook portion 12' in the normal manner so that the backing of loop portion 12" is outermost. The backing of the loop portion 12" is provided with the adhesive means 11 which may be a layer of adhesive applied to the backing and protected by a release sheet or a separate adhesive tape having adhesive on both sides where one side serves to secure the adhesive tape to the loop portion 12" and the other side provides an adhesive mounting surface for the holder 1. In this respect, the adhesive may be a substantially permanent adhesive which will secure the loop portion 12" to a surface, or the adhesive may be a reusable, dry type adhesive which permits the holder to be positioned and then removed and repositioned for temporary mounting. Secured to the exposed adhesive surface is the magnetic mounting means 10 which forms the first outermost layer of the stacked mounting means 9. Magnetic means 10 is preferably a flexible magnetic tape material, such as a ferrous polymer, in which the surface 10' adjacent to the adhesive means has the properties of a release sheet which protects the adhesive until removal.

In this embodiment, the cup holder 1 is selectively mountable to a variety of surfaces by removing the unwanted mounting means so as to expose that one which is suitable for the particular surface. Thus, if the surface to which the cup holder 1 is to be mounted is steel, one can use the magnetic means 10 directly without removing any intervening layers. In this manner, the holder 1 may also be repositioned. Alternatively, if the surface is non-magnetic, the magnetic means 10 is removable, thus exposing the adhesive layer 11 which may be used to secure either the holder 1 or the loop portion 12" of the hook and loop fastener 12 to the surface. The holder may then be removed by separating the two halves of the hook and loop fastener 12. Other loop portions of hook and loop fastener material may be placed at other locations and the holder 1 moved from one to the other. In those instances where a loop or pile material is already in place, the magnetic means 10, adhesive means 11 and loop portion 12" may be removed and the holder 1 used with such existing loop or pile material, such as automobile carpeting or pile material dashboard covers.

Figure 2:
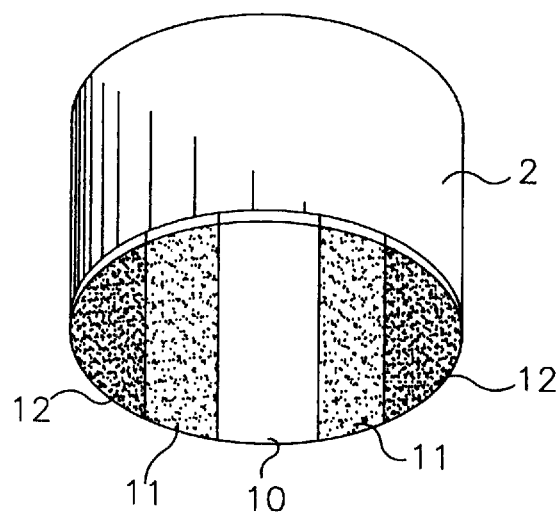
FIG. 2 is a view of the underside of the cup holder of the present invention showing an alternative embodiment for the selective mounting means.

In an alternative embodiment illustrated in FIG. 2, the mounting means 9 are positioned on the lower end 4 of the cylindrical body 2 in a side-by-side relationship. Thus, as shown, the magnetic means 10 is centrally position on the bottom of body 2 and is flanked on both sides first by the adhesive means 11, then by the hook and loop fastener 12. In this embodiment, the adhesive means 11 is protected by a removable release sheet and the hook and loop fastener 12 is oriented so that the hook portion 12' is adhered to the body 2 with the loop portion 12" attached to the hook portion 12' in the normal manner. In this manner, one may use any one of the available mounting means 9 without removing any intermediate layers. Also, the loop portion 12" of the hook and loop fastener 12 will be provided with an exposable adhesive both to secure the loop portion 12" to a surface and to assist in adhesive mounting of the holder 1 when the adhesive means 11 is used. Alternatively, the adhesive means 11 may be provided as the adhesive backing on the loop portion 12" and the separate adhesive means between the magnetic means 10 and the hook and loop fastener 12 eliminated.

Figure 5:
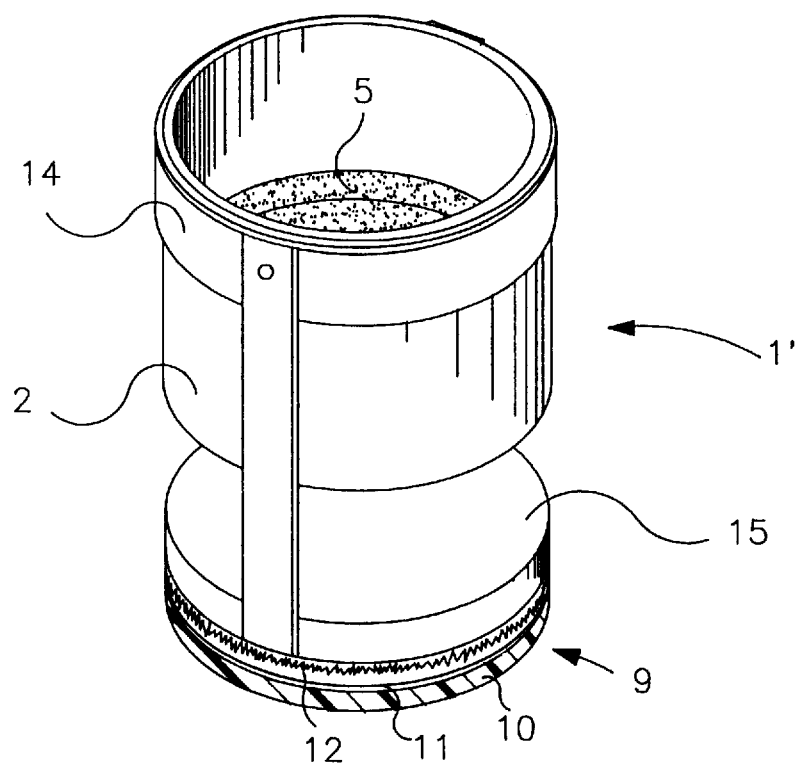
FIG. 5 is a view of an alternative holder assembly of the present invention incorporating a gimbal mechanism.

In a further alternative embodiment, illustrated in FIG. 5 and particularly suitable for use on boats and other watercraft, the cylindrical body 2 is supported in a gimbal assembly 14 which has a base portion 15 on the underside of which the mounting means 9 are positioned. In this manner, the holder 1' comprises the cylindrical body 2 and insert 5, and the gimbal assembly 14, the whole being selectably mountable to different surfaces and supports the body 2 which is allowed to swing with the motion of the vehicle on which the apparatus is mounted. The gimbal assembly 14 allows the body 2 to remain vertical thereby holding any beverage container placed therein vertical.

The foregoing description presents the preferred embodiments of the present invention and it is understood that many variations and modifications of those embodiments will be evident to those skilled in the art and may be carried out without departing from the spirit and scope of the present invention.

What is claimed is:

1. A holder for a beverage container comprising a cylindrical body having an open end and a closed end forming a receptacle, a resilient insert positionable within said receptacle, a base and a plurality of selectable mounting means positionable on the underside of said base, said selectable mounting means comprise a magnetic means, an adhesive means and a hook and loop fastening means, whereby said insert is adapted to receive and hold a beverage container within said receptacle and whereby said selectable mounting means are capable of removably securing said holder to a plurality of alternative surfaces.

2. The holder of claim 1 wherein said selectable mounting means are positioned in stacked array whereby a particular mounting means is exposed for use by removal of a preceding means.

3. The holder of claim 2 wherein a backing of said hook portion of said hook and loop fastener is adhered to the underside of said base and the selectable mounting means are arranged in the order of said hook and loop fastening means, said adhesive means and said magnetic means.

4. The holder of claim 3 wherein said adhesive means comprises a reusable and repositionable adhesive.

5. The holder of claim 3 wherein said adhesive means comprises a double sided adhesive tape wherein one side is adhered to a backing of said loop portion of said hook and loop fastener and the other side is protected by a release sheet attached to said magnetic means.

6. The holder of claim 5 wherein said magnetic means is a flexible magnetic tape.

7. The holder of claim 1 wherein said selectable mounting means are positioned in a side-by-side arrangement across the underside of said base.

8. The holder of claim 1 wherein said resilient insert comprises a ring of foam material.

9. The holder of claim 1 wherein said resilient insert comprises a water resistant corrugated material formed into a cylinder lining the inside of said receptacle.

10. The holder of claim 1 wherein said resilient insert comprises a coil spring positioned around the inside of said receptacle.

11. A beverage container holder comprising a planar bottom surface having a substantially cylindrical upstanding sidewall forming a receptacle capable of receiving a beverage container, a cylindrical resilient member receivable within said receptacle and having an outside diameter substantially equal to the inside diameter of said receptacle and capable of snugly and releasable receiving said beverage container whereby said beverage container is held within said receptacle, and a plurality of selectable mounting means secured to said bottom surface of said receptacle on the side opposite to said sidewall wherein said plurality of selectable mounting means comprises a hook and loop fastener, an adhesive means and a magnetic means positioned on said bottom surface of said receptacle so as to be selectively engagable with a mounting surface, whereby said holder is selectable and removably mountable to a plurality of alternative surfaces.

12. The holder of claim 11 wherein said selective mounting means are positioned in an alternating side-by-side relationship across said bottom surface.

13. The holder of claim 11 wherein said resilient member comprises a ring of expanded foam.

14. The holder of claim 11 wherein said resilient member comprises a layer of water resistant corrugated material lining the inner surface of said receptacle sidewall.

15. The holder of claim 11 wherein said resilient member comprises a coil spring positioned within said receptacle to form a ring at the base of said sidewall.

16. The holder of claim 11 wherein said selective mounting means are positioned on said bottom surface in a stacked relationship in the order of the hook portion of said hook and loop fastener, the loop portion of said hook and loop fastener whereby said hook and loop portions are engaging, said adhesive means and said magnetic means, whereby said magnetic means provides a means for removably mounting said holder on a ferrous metal surface and is removable to expose said adhesive means whereby said holder is adhesively mountable to any surface, and said adhesive means being a part of said loop portion of said hook and loop fastener whereby said loop portion is adhesively fixable to a mounting surface and whereby said adhesive and said loop portion are removable to expose said hook portion of said hook and loop fastener whereby said holder is releasably mountable to a pile covered surface including said adhesively fixed loop portion.

17. The holder of claim 16 wherein said adhesive means comprises a releasable and reusable adhesive whereby said holder is adhesively removable and repositionable.

18. The holder of claim 16 wherein said adhesive means comprises a permanent adhesive whereby said loop portion of said hook and loop fastener is permanently mountable to a surface and said holder is removable by separating said hook portion from said loop portion, and wherein said magnetic means comprises a protective release means on the side abutting said adhesive.

* * * * *